Patented Aug. 9, 1949

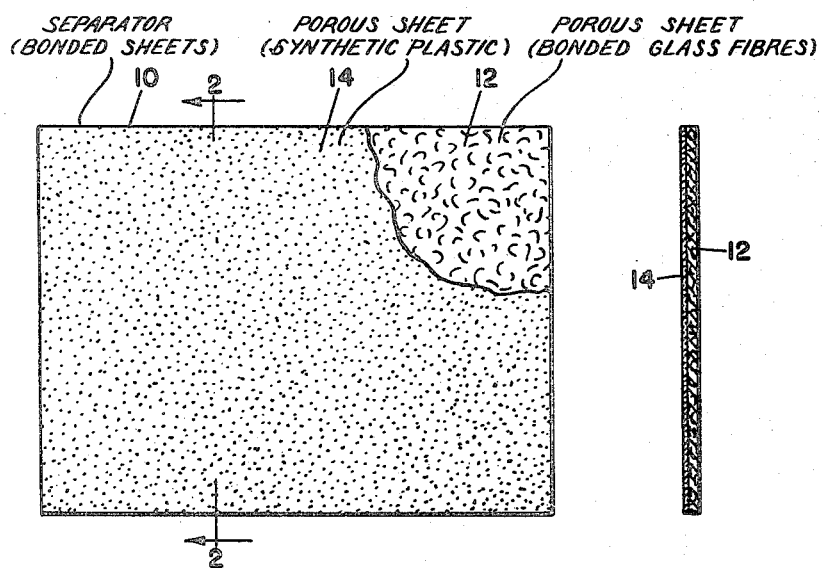

2,478,186

UNITED STATES PATENT OFFICE 2,478,186

STORAGE BATTERY SEPARATOR

Lipman S. Gerber, Lakewood, N. J.

Application October 19, 1945, Serial No. 623,427

5 Claims. (Cl. 136—145)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in storage battery separator plates, and more particularly to a type suitable for dry-charged storage batteries.

In order to more effectively ship and store storage batteries of the acid type, it has been found desirable to use a modified storage battery plate construction which is commonly known as "dry charged." It has been found possible to store batteries of this type for indefinite periods without substantial deterioration and when filled with acid and given a short charge the plates are adequately developed and the initial life of the storage battery commences.

It has been found difficult, however, to obtain an adequate and satisfactory separator which had the required characteristics of low resistance, adequate strength, and one which would stand up not only while the battery was without moisture but also after the battery was put in operation. Micro-porous rubber separators have been the most satisfactory up to this time.

The principal object of my invention is to provide an improved type of battery separator particularly adapted for the dry-charged type of storage battery which will meet the electrical and physical characteristics and be of equal or longer life than micro-porous type of rubber separators.

A further object of my invention is to provide a compound impregnated glass fibre separator combined with a thin sheet of impregnated fibre or plastic material to materially reduce porosity and prevent bridging of the lead compounds through the separator.

Further objects and advantages of my invention will appear from the following description of a preferred form of embodiment of my invention taken in connection with the attached drawing illustrative thereof and in which:

Fig. 1 is a plan view of one form of battery separator with a portion thereof broken away to show the internal construction;

Fig. 2 is a cross-section of the separator shown in Fig. 1.

It has been found that in dry-charged storage batteries a relatively long storage life and a relatively long active life could be obtained by the use of micro-porous battery separators. Shortage of rubber, however, materially reduced the availability of separators and with the increased demand for storage batteries, substitute materials were carefully investigated. At such time the glass fibre separator was again considered but found unsatisfactory, particularly due to the partial bridging of the battery plate material through the open pores of the glass fibres. While such batteries show good cold characteristics the low electrical capacity after an accelerated life test rendered them unfit for their desired purpose.

Fibre glass separators have usually been used in conjunction with wood veneer, but this is satisfactory only in wet batteries for the veneer separates in dry batteries. It is, of course, to be understood that if moisture is present sufficient to protect the separator, there is a constant discharge of the battery.

The objective has therefore been to provide a battery separator having the electrical and physical characteristics of the micro-porous rubber separators without requiring the use of any rubber.

In investigating the phenomenon of the failure of the dry-charged batteries, I observed that the bridging condition was due to the impossibility of controlling to a high and uniform degree the porosity in the fibre structure. Although careful specifications were set forth limiting the density of the glass to .135 centi-grams per square inch per mil thickness, which expressed in metric units is 8.238 milligrams per square centimeter per millimeter thickness, and a maximum fibre diameter of .0005 inch or .0127 millimeter was the largest tolerated, it was still noted that batteries failed after as low as 56 charging cycles.

I have overcome the previous difficulties noted and have not only succeeded in equalling but in exceeding the life of the dry-charged battery, using the best known form of micro-porous battery separator by the use of my improved laminated separator. As shown in the drawing attached, this battery separator 10 consists of two principal elements. It includes a glass fibre sheet 12 which may be suitably spun and woven in cross-grain form and which may be provided with a suitable phenolic binder. In addition, as the second element, it includes a thin slightly porous cellulose sheet produced by pressing cellulose fibers closely together into thin matted sheet form through well known processes, or similar partially porous board, coating or film, similarly made of fibres or particles of synthetic resin or plastic material such as Vinylite, the second element being less porous than the glass fiber sheet.

It is recommended that the thin sheet of the fibre or coating 14 be impregnated and bonded to the sheet 12 of glass fibre of the proper thickness by means of a phenolic resin and then passed through an oven of the proper temperature for curing the impregnated fibre coating to make it resistant to the battery electrolyte.

The principal function of this cellulosic or fibrous sheet less porous than the glass fiber sheet is to reduce porosity and prevent the bridging of the lead materials of the respective charged plates. It has the additional advantage, however, of increasing rigidity of the glass fibre sheet and improving the otherwise desirable characteristic of glass fibre separators.

By a suitable choice of materials it is possible to obtain a separator which will not exceed .03 ohm per square inch for a separator of 70 mil thickness.

It is found that this type of laminated separator having the glass fiber sheet bonded to the cellulose or plastic sheet, coating or film as herein described has an especially satisfactory durability, is rigid and easily handled and most effectively prevents treeing or bridging of the lead plate material. If the glass fibres are arranged to run vertically it is possible to permit circulation of the electrolyte and allow for greater cooling, thus further improving the battery characteristics and permitting greater overcharges. The flat impregnated fibre against the negative plate will retain the plate material and help prolong the life of the battery. The glass fibre sheet tends to hold the plate material from dropping from the plates thereby preventing short circuits.

No rubber or other critical materials are necessary and the batteries with this type of separator have a greater effective discharge rate and are particularly useful, both in extremely low and high temperatures starting conditions.

While I have shown and described a preferred form of embodiment of my invention, I am aware that modifications may be made thereto and I therefore desire a broad interpretation of my invention within the scope and spirit of the description herein and of the claims appended hereinafter.

What I claim is:

1. A separator for the plates of a dry-charged acid type storage battery consisting of a laminated structure including a porous sheet of glass fibres held in relative position by a binder material, and a thin slightly porous sheet of synthetic plastic material bonded as a coating to said sheet of glass fibres to reduce porosity of the latter.

2. A separator for the plates of a dry-charged acid type storage battery consisting of a laminated structure including a porous sheet of glass fibres held in relative position by an impregnated binder material, and a thin slightly porous sheet of synthetic resin bonded as a partially porous crating to said sheet of glass fibres to reduce porosity of the latter.

3. A separator for the plates of a dry-charged acid type storage battery consisting of a laminated structure including a porous sheet of glass fibres held in relative position by an impregnated phenolic resin binder, and a thin slightly porous sheet of synthetic resin material bonded by a phenolic resin to said sheet of glass fibres to reduce porosity of the latter and thereby prevent bridging of lead compounds through the separator.

4. A separator for the plates of a dry-charged acid type storage battery consisting of a laminated structure including a porous sheet of glass fibres spun and woven in cross-grain form and held in relative position by a binder material, and a thin slightly porous sheet of synthetic resin material bonded as a coating to said sheet of glass fibres to reduce porosity and thereby prevent bridging of lead compounds through the separator.

5. A separator as set forth in claim 4, in which said porous sheet of spun and woven glass fibres includes glass fibres running vertically with respect to the battery to permit circulation and cooling of battery electrolyte.

LIPMAN S. GERBER.

REFERENCES CITED

The following references are of record in the file of this patent:

UNITED STATES PATENTS

| Number | Name | Date |
|---|---|---|
| Re. 16,548 | Waddell | Feb. 8, 1927 |
| 1,366,223 | Wales | Jan. 18, 1921 |
| 2,117,371 | Slayter | May 17, 1938 |
| 2,133,183 | Baird et al. | Oct. 11, 1938 |
| 2,287,305 | Haverbeck | June 23, 1942 |

FOREIGN PATENTS

| Number | Country | Date |
|---|---|---|
| 763,866 | France | Feb. 19, 1934 |